United States Patent
Polland et al.

(10) Patent No.: US 9,013,982 B2
(45) Date of Patent: Apr. 21, 2015

(54) M-PAIR MODE PROTECTION SWITCHING

(75) Inventors: Joe Polland, Eden Prairie, MN (US); Clifton Powers, Raleigh, NC (US); Manish Sharma, Eden Prairie, MN (US); Laxman R. Anne, Eden Prairie, MN (US); Yiu Lam Chan, Raleigh, NC (US)

(73) Assignee: ADC DSL Systems, Inc., Berwyn, PA (US)

( * ) Notice: Subject to any disclaimer, the term of this patent is extended or adjusted under 35 U.S.C. 154(b) by 564 days.

(21) Appl. No.: 13/187,306

(22) Filed: Jul. 20, 2011

(65) Prior Publication Data

US 2013/0021899 A1    Jan. 24, 2013

(51) Int. Cl.
*G01R 31/08* (2006.01)
*H04L 12/28* (2006.01)
*H04M 11/06* (2006.01)

(52) U.S. Cl.
CPC ......... *H04L 12/2898* (2013.01); *H04M 11/062* (2013.01)

(58) Field of Classification Search
CPC ............... H04L 41/06–41/0695; H04L 69/40; H04L 29/14; H04L 45/28; H04L 2012/6478; H04L 12/2878–12/2898; H04L 12/403–12/4035; H04L 2012/5675; H04L 2012/6459
See application file for complete search history.

(56) References Cited

U.S. PATENT DOCUMENTS

| | | | |
|---|---|---|---|
| 7,200,110 B1 | 4/2007 | Burns et al. | |
| 7,242,860 B2 | 7/2007 | Ikeda et al. | |
| 7,272,209 B2 | 9/2007 | Jiang et al. | |
| 7,443,789 B2 | 10/2008 | Glaser et al. | |
| 7,864,667 B2 | 1/2011 | Zhou et al. | |
| 7,869,464 B2 | 1/2011 | Polland et al. | |
| 8,457,219 B2* | 6/2013 | Pons et al. | 375/260 |
| 2003/0095502 A1 | 5/2003 | Glaser et al. | |
| 2005/0105473 A1 | 5/2005 | Hausman et al. | |
| 2006/0062206 A1 | 3/2006 | Krishnaswamy | |

(Continued)

FOREIGN PATENT DOCUMENTS

WO    WO/2010/047629    4/2010

OTHER PUBLICATIONS

Cisco Systems Inc., "Cisco Symmetric High-Bitrate DSL High Speed WAN Interface Cards for Cisco Integrated Services Routers", 1999-2006, Publisher: Cisco Systems, Inc.

(Continued)

*Primary Examiner* — Andrew Chriss
*Assistant Examiner* — Kenan Cehic
(74) *Attorney, Agent, or Firm* — Fogg & Powers LLC

(57) ABSTRACT

A communication comprises a plurality of digital subscriber line (DSL) links, a first node having at least one application port configured for an elastic service and a plurality of DSL ports, and a second node having at least one application port configured for an elastic service and a plurality of DSL ports. Each of the first and second nodes is configured to interleave data received over the at least one application port across the plurality of DSL ports, each DSL port allocated a set of DSL timeslots for transport of the data received over the at least one application port. When a failure is detected on one of the DSL links, each of the first and second nodes is configured to interleave the data received over the at least one application port across the remaining DSL ports not connected to the failed DSL link without adjusting the set of DSL timeslots allocated to each of the remaining DSL ports for transport of the data from the at least one application port.

8 Claims, 9 Drawing Sheets

(56) References Cited

U.S. PATENT DOCUMENTS

| | | | |
|---|---|---|---|
| 2006/0274647 A1 | 12/2006 | Wang et al. | |
| 2008/0285437 A1 | 11/2008 | Polland | |
| 2009/0092149 A1* | 4/2009 | Zhou et al. | 370/463 |
| 2009/0290603 A1* | 11/2009 | Zhou et al. | 370/537 |
| 2013/0022094 A1 | 1/2013 | Polland et al. | |

OTHER PUBLICATIONS

Yaakov Stein, "Automatic Protection Switching", Apr. 2009, Publisher: RAD Data Communications.

Thomson Gateway, "SHDSL Configuration Guide R8.2 and Higher", "http://www.thomson-broadband.com", Jun. 2008, Published in: Belgium.

International Searching Authority, "International Search Report", "from Foreign Counterpart of U.S. Appl. No. 13/187,306", Jan. 17, 2013, pp. 19, Published in: WO.

U.S. Patent and Trademark Office, "Office Action", "U.S. Appl. No. 13/187,308", Jul. 11, 2013, pp. 1-26.

International Searching Authority, "International Search Report", "from Foreign Counterpart of U.S. Appl. No. 13/187,308", Dec. 20, 2012, pp. 1-9, Published in: WO.

Polland et al., "N+N Protection Switching", "U.S. Appl. No. 13/187,308, filed Jul. 20, 2011", Jul. 20, 2011, pp. 1-36.

The International Bureau of WIPO, "International Preliminary Report on Patentability from PCT Application No. PCT/US2012/047417 mailed Jan. 30, 2014", "From PCT Counterpart of U.S. Appl. No. 13/187,306", Jan. 30, 2014, pp. 1-6, Published in: WO.

\* cited by examiner

M-PAIR MODE PROTECTION SWITCHING

CROSS-REFERENCE TO RELATED APPLICATIONS

This application is related to co-pending U.S. patent application Ser. No. 13/187,308 entitled "N+N PROTECTION SWITCHING" filed on even date herewith and which is referred to herein as the '1189 application. The '1189 application is hereby incorporated herein by reference.

BACKGROUND

A typical digital subscriber line (DSL) communication network consists of a central unit and remote units, connected together by DSL. Each unit can be equipped with various application interfaces or ports, such as G.703, Ethernet, and Nx64k. The data received from the application ports is transported between DSL units over DSL links, such as over G.SHDSL (G.991.2) interfaces.

SUMMARY

In one embodiment, a communication system is provided. The communication comprises a plurality of digital subscriber line (DSL) links, a first node having at least one application port configured for an elastic service and a plurality of DSL ports, and a second node having at least one application port configured for an elastic service and a plurality of DSL ports. Each of the first and second nodes is configured to interleave data received over the at least one application port across the plurality of DSL ports, each DSL port allocated a set of DSL timeslots for transport of the data received over the at least one application port. When a failure is detected on one of the DSL links, each of the first and second nodes is configured to interleave the data received over the at least one application port across the remaining DSL ports not connected to the failed DSL link without adjusting the set of DSL timeslots allocated to each of the remaining DSL ports for transport of the data from the at least one application port.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
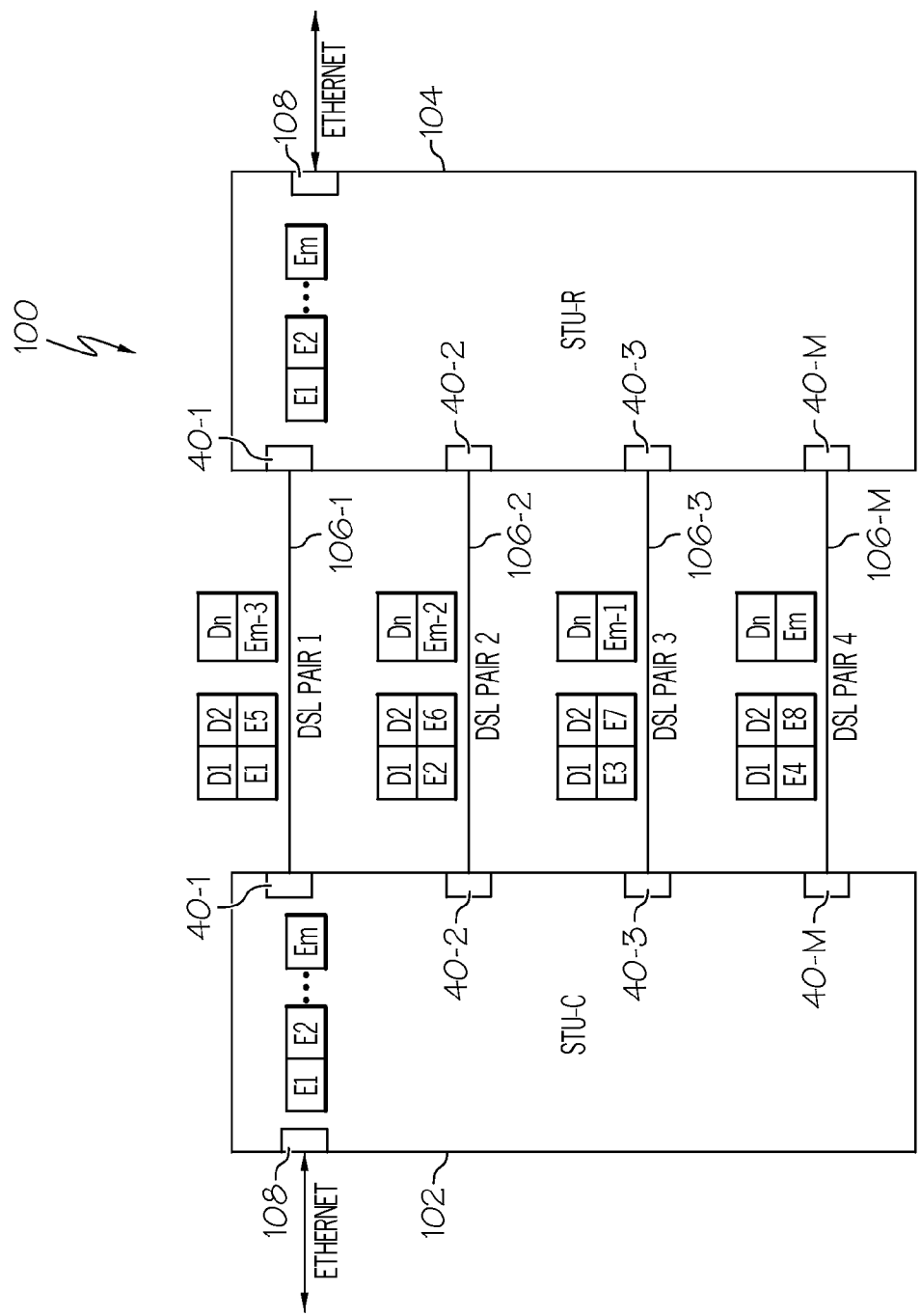
FIGS. 1A-1F are block diagrams of embodiments of a communication system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1A is a block diagram depicting an exemplary communication system 100. The communication system 100 includes two digital subscriber line (DSL) units 102 and 104. The DSL units 102 and 104 are communicatively coupled together via a plurality of DSL pairs 106-1 ... 106-M (also referred to herein as DSL links), where M represents the number of DSL pairs. In the embodiment shown in FIG. 1A, there are four DSL pairs. However, it is to be understood that, in other embodiments, other numbers of DSL pairs are used. Each DSL pair 106 is connected to a respective DSL port 40 in each of DSL units 102 and 104. In this embodiment, each of DSL units 102 and 104 are configured according to the Global.standard High-Bit-Rate Digital Subscriber Line (G.SHDSL) standard. However, it is to be understood that other DSL technologies can be implemented in other embodiments. In addition, in this embodiment, DSL unit 102 is configured as a central unit (also known as an STU-C) while DSL unit 104 is configured as a remote unit (also known as an STU-R).

Each of DSL units 102 and 104 also includes at least one application port 108. In this example, each of the at least one application ports 108 is configured for an Ethernet interface format. As used herein, Ethernet is a family of frame-based technologies defined in the Institute of Electrical and Electronics Engineers (IEEE) standard 802.3. Ethernet is an elastic service in that the data from an Ethernet packet can be divided into varying numbers of DSL timeslots for transport between the DSL units 102 and 104. Thus, an elastic service is defined as a service for which the data can be divided into varying numbers of DSL timeslots. In other words, an elastic service does not require a fixed number of DSL timeslots. For example, the payload of an Ethernet packet received at the application port 108 is extracted from the packet, encapsulated and assigned to a number of allocated DSL timeslots. In particular, the Ethernet frames are encapsulated into high-level data link control (HDLC) format frames and then inserted into an internal pulse code modulation (PCM) timeslot stream as described in more detail below with respect to FIG. 2. The PCM timeslot stream is then mapped into DSL timeslots. If the original number of allocated DSL timeslots is reduced, the PCM timeslot stream is also reduced accordingly to maintain an equivalent number of timeslots and is then mapped to the reduced number of allocated DSL timeslots. Thus, the Ethernet frames are still transported over the reduced number of timeslots. However, since the number of timeslots was reduced, the amount of time it takes to complete transmission of the Ethernet frames is increased. Thus, Ethernet does not require a fixed number of DSL timeslots for transmission to be completed. If there are bursts of Ethernet traffic that exceed the allocated timeslot bandwidth, a protocol such as 802.3x Ethernet flow control protocol may be optionally used to implement flow control across the Ethernet port until a channel is available.

In contrast, a non-elastic service such as Nx64k or E1, cannot complete transmission over the reduced number of timeslots since the non-elastic services require a fixed number of timeslots or the transmission will typically fail. Thus, in this example, the elastic service is implemented using Ethernet. However, it is to be understood that other elastic services that do not require a fixed number of DSL timeslots can be used in other embodiments.

In addition, in this embodiment, DSL units 102 and 104 are operating in M-pair mode. In M-pair mode, DSL pairs 106 effectively create an aggregate bandwidth. For example, in some embodiments each DSL pair has a maximum bandwidth of 2.3 Mbits creating a maximum aggregate bandwidth of 4.6 Mbits in embodiments with two DSL pairs. However, it is to be understood that the maximum bandwidth is not used for transport of traffic in some embodiments. In particular, in some embodiments, each DSL pair is run at the minimum data rate required to transport the user data. For example, if a system having 4 DSL pairs transports 4 Mbits/second of user data traffic, each DSL pair is configured to be run at 1 Mbit/second, in some embodiments. Similarly, if the system having 4 DSL pairs transports 8 MBits/second of user data traffic, each DSL pair is configured to be run at 2 Mbits/second in such embodiments. Running at the minimum data rate needed for each DSL pair can result in improved reach and error ratios.

The aggregate bandwidth is implemented, in this example, by interleaving the PCM timeslot stream containing the Ethernet frames over the plurality of DSL pairs 106-1 . . . 106-M. For example, as shown in FIG. 1, each DSL pair is configured with D1 . . . Dn timeslots, where Dn is the total number of timeslots allocated to each DSL pair for the application port 108. The PCM timeslot stream is configured with Em timeslots, where Em is equal to the aggregate number of DSL timeslots. In this example, Em is equal to M×Dn, where M is equal to 4 in this example and Dn is the same for each DSL pair. Since there are 4 DSL pairs in this example, Em is equal to 4×Dn. Thus, the total number of timeslots available for the Ethernet frame is 4×Dn. In addition, the number of timeslots available on each DSL pair is not the same as the other DSL pairs, in some embodiments. However, the total number of PCM timeslots, Em, remains equal to the aggregate number of DSL timeslots.

In this example, the first PCM timeslot, E1, is assigned to the first DSL pair 106-1, the second PCM timeslot, E2, is assigned to the second DSL pair 106-2, etc. After a timeslot has been assigned to DSL pair 106-M, the order begins again with the next timeslot being assigned to the first DSL pair 106-1 and so forth. This interleaving continues until the last PCM timeslot, Em, is assigned to DSL pair 106-M. Notably, although the last PCM timeslot Em is assigned to the last DSL pair 106-M, in this example, it is to be understood that the last Em timeslot can be configured to end on any of the DSL pairs 106. For example, if the number of timeslots allocated on the DSL pairs is not exactly divisible by the total number of DSL pairs, M, then the last timeslot will not end on the last DSL pair 106-M.

By interleaving the PCM timeslots, the aggregate bandwidth of the plurality of DSL pairs 106 is used to transport the Ethernet frames between the DSL units 102 and 104. At the other DSL unit, Ethernet timeslots are extracted from DSL timeslots and placed on an internal PCM timeslot stream. At the Ethernet interface, HDLC frames are extracted from the PCM timeslots, the HDLC encapsulation is error checked and is then removed, and the Ethernet frame is reconstructed and transmitted via the application port 108.

Figure 1B:
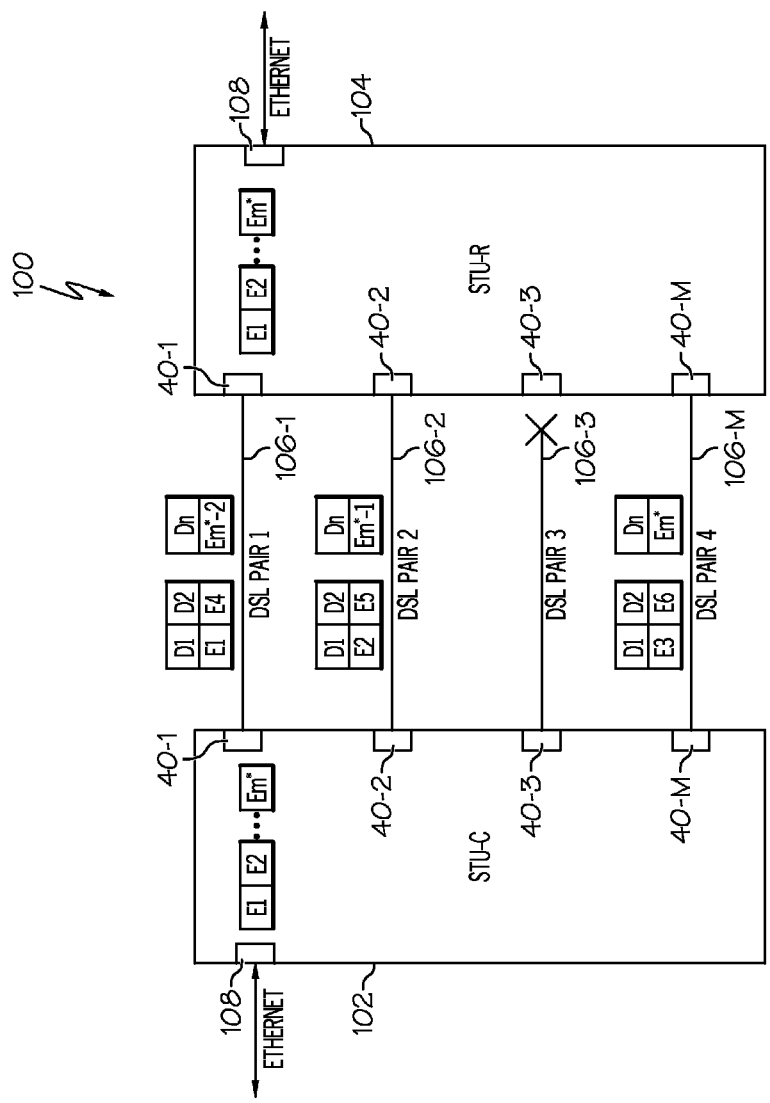

In the event that one of the DSL pairs 106 fails, such as DSL pair 106-3 in FIG. 1B, each of the DSL units 102 and 104 are configured to remap the PCM timeslot stream to the remaining DSL pairs 106. In particular, a new timeslot map is created to interleave the PCM timeslots between DSL pairs 106-1, 106-2 and 106-M. Initially, with four DSL pairs, there were Em timeslots available in this example. After the failure of DSL pair 106-3, the number of timeslots available is reduced to Em*, where Em* is equal to Em−(the number of timeslots allocated on DSL pair 106-3). For example, if the Ethernet timeslot service is configured with 100 timeslots, the timeslots are evenly distributed over the DSL pairs 106 by circularly and serially adding the timeslots to the DSL pairs 106. In this example, since there are four DSL pairs 106, each DSL pair 106 is assigned 25 timeslots per DSL frame. If one link fails, each remaining DSL pair 106 still has 25 timeslots. Thus, the number of available timeslots is reduced from 100 to 75 in this example.

Although the total number of timeslots is less after pair 106-3 fails, Ethernet is an elastic service, as described above, and can operate at a lower bandwidth. In some embodiments, when DSL failure is detected, 802.3x Ethernet flow control protocol may be optionally used on the Ethernet application ports 108 to halt traffic. Once the new timeslot map is created, 802.3x flow control is removed to allow traffic to resume with the new timeslot map.

The new timeslot map is defined in the DSL units 102 and 104 at the Ethernet application port side, and at the DSL port side. Each DSL pair 106 is configured to insert and extract different timeslots (i.e. insert for transmit, extract for receive). For example, using the new timeslot map at the DSL unit 102, DSL pair 106-1 is configured to insert and extract timeslots D1(E1), D2(E4), and DN(Em*−2), as shown in FIG. 1B, instead of D1(E1), D2(E5), and DN(Em−3), as shown in FIG. 1A. Thus, the new timeslot map divides the Ethernet payload among 75 timeslots rather than 100. Since the number of DSL timeslots was reduced, the time needed to complete transmission will increase. For example, prior to failure of DSL pair 106-3, the 100 PCM timeslots could be aggregated and transmitted in a single DSL frame (25 timeslots per frame per DSL pair). After the failure of DSL pair 106-3, there are 75 timeslots from the PCM stream and 25 DSL timeslots per frame on each of the remaining DSL pairs. Therefore, transmission of the Ethernet payload will require more time since 75 timeslots are used rather than the original 100 timeslots.

Figure 1C:
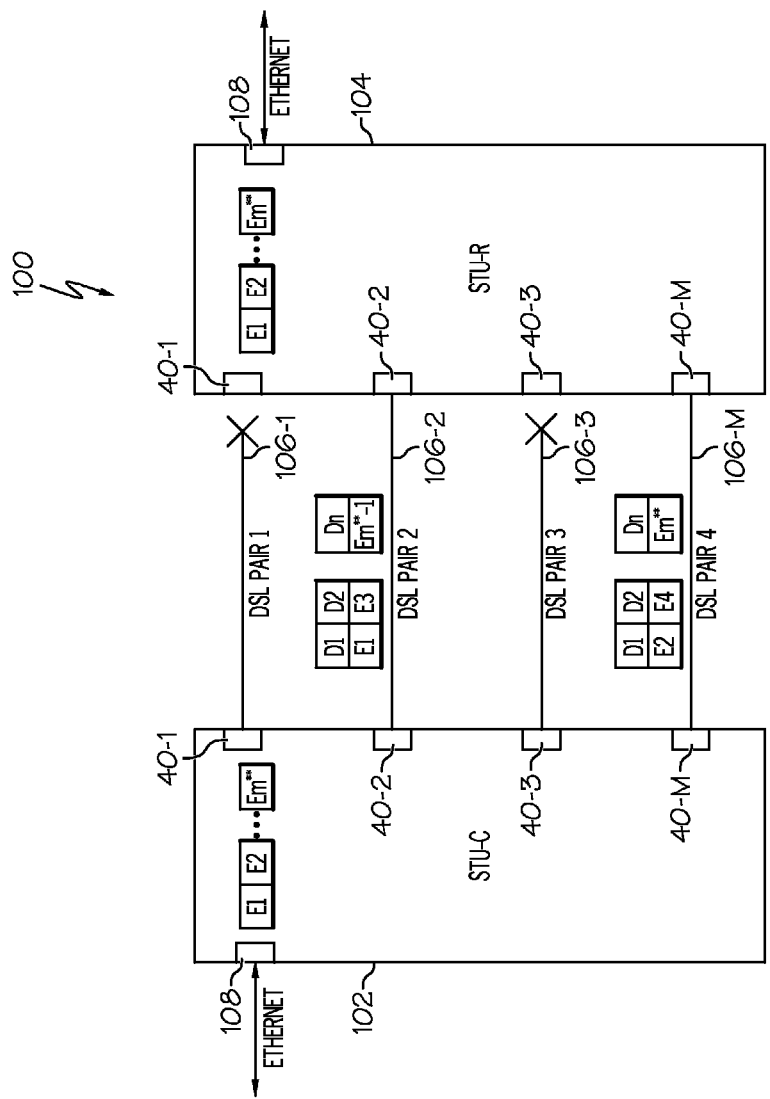

If another DSL pair 106 fails, such as DSL pair 106-1 in FIG. 1C, the DSL units 102 and 104 update the timeslot map again. In particular, a new timeslot map is created to interleave the PCM timeslots between DSL pairs 106-2 and 106-M. After the failure of DSL pair 106-1, the number of timeslots available is further reduced from Em* to Em, where Em is equal to Em−(the number of timeslots allocated on DSL pair 106-1 and 106-3). Thus, the Ethernet traffic is still communicated despite failure of multiple DSL pairs although with a smaller bandwidth. In some embodiments, if one of the failed DSL pairs recovers, the DSL units 102 and 104 are configured to create a new timeslot map that includes the recovered DSL pair. In other embodiments, a new timeslot map is not created even if one or more of the failed DSL pairs subsequently recovers. As used herein, the term "recovers" refers to correction or removal of the source of the error which caused the DSL link to fail.

Figure 1D:
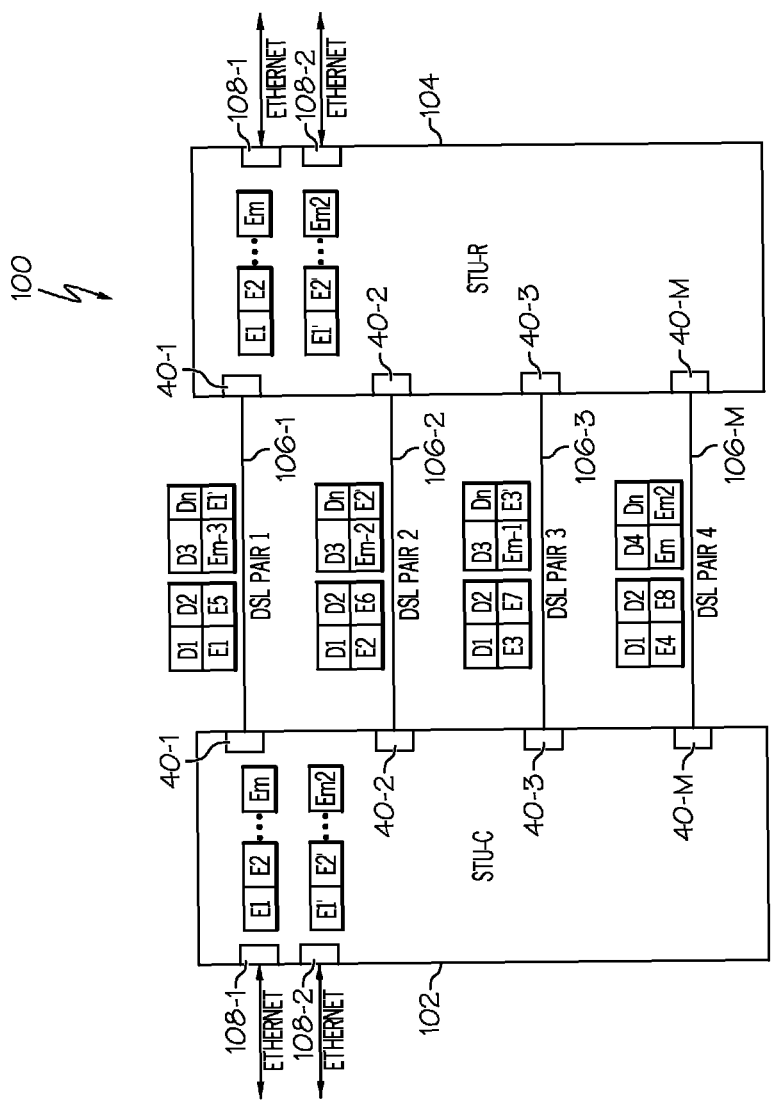
Figure 1E:
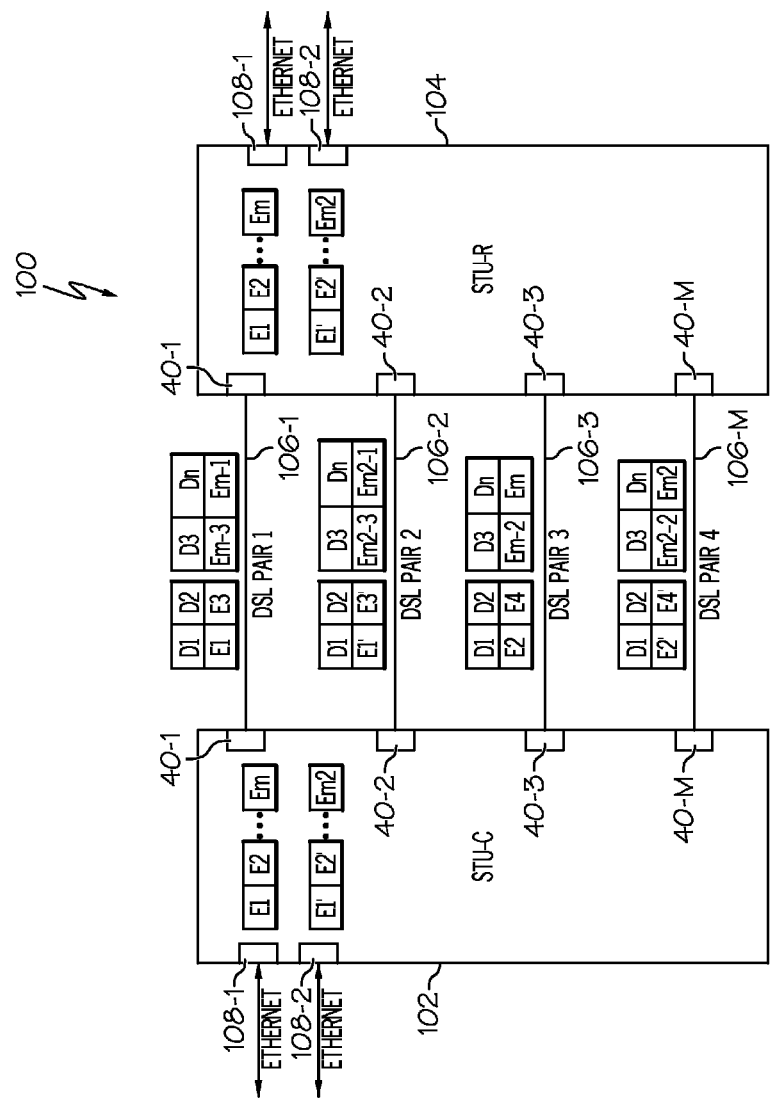

In addition, although only one application port 108 is shown in FIGS. 1A-1C, it is to be understood that more than one application port 108 can be implemented in other embodiments as shown in FIG. 1D. In the example shown in FIG. 1D, the timeslots from application ports 108-1 and 108-2 are interleaved circularly and serially. That is, the PCM timeslots from the first application port 108-1 are interleaved among the DSL pairs 106-1 . . . 106-M. After interleaving the timeslots from the first application port 108-1, the PCM timeslots from the second application port 108-2 are interleaved among the DSL pairs 106-1 . . . 106-M. Furthermore, in some embodiments having more than one application port 108, the data from the plurality of application ports is interleaved circularly and in parallel as shown in FIG. 1E.

Figure 1F:
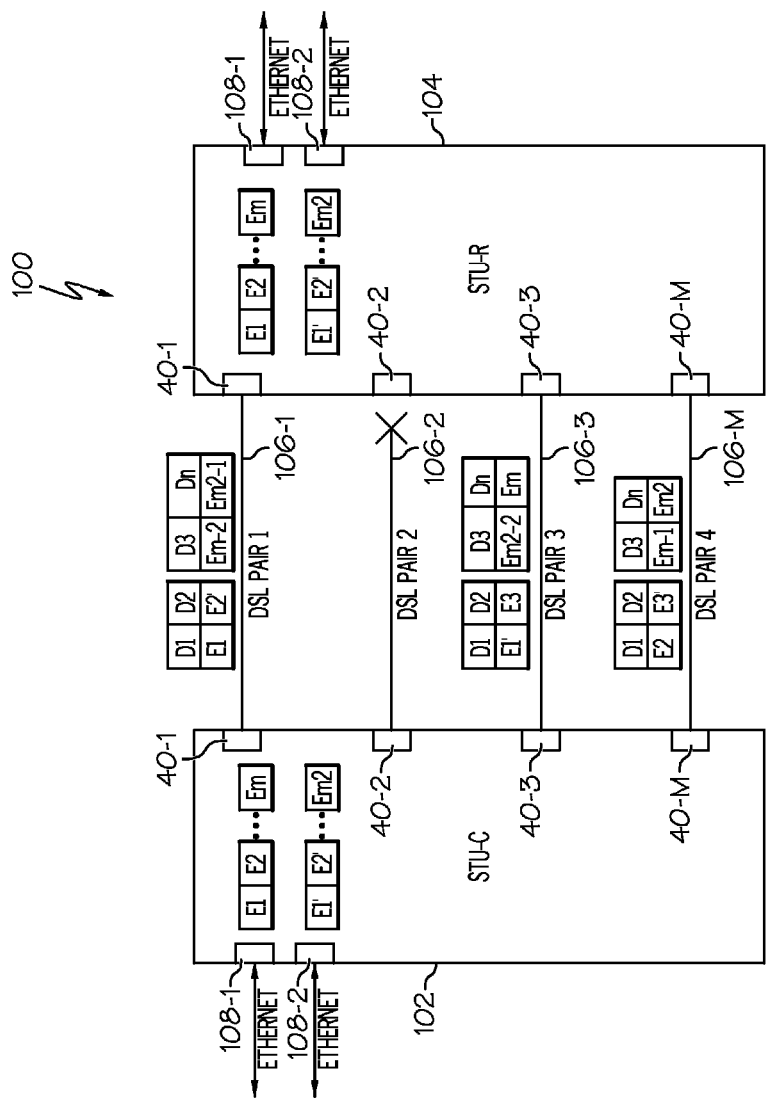

The procedures described above for compensating for failure of a DSL pair are also applicable to embodiments in which more than one application port 108 is used. For example, as shown in the example of FIG. 1F, the bandwidth for both application ports 108-1 and 108-2 is reduced as described above with respect to one application port. The timeslot map is updated to interleave the timeslots circularly and in parallel, as in FIG. 1E, taking into account the failure of DSL pair 106-2. It is to be understood that in other embodiments, the timeslot map is updated to interleave the timeslots circularly and serially, as in FIG. 1D, taking into account any failed DSL pairs, as described above.

Figure 2:
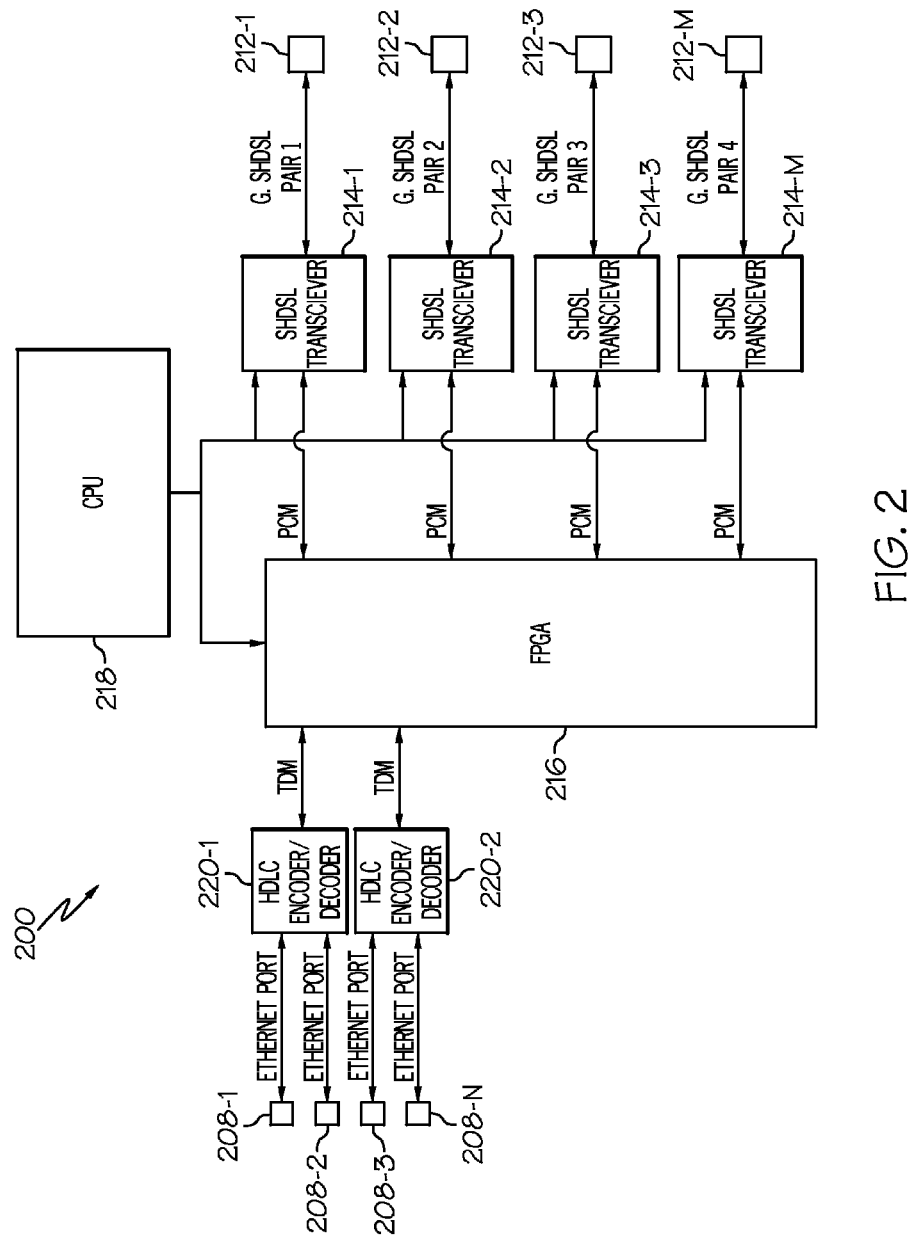
FIG. 2 is a block diagram of one embodiment of a communication unit.

FIG. 2 is a block diagram of one embodiment of a communication unit 200 configured to implement the N Good Pairs in M-pair mode protection switching described herein. The communication unit 200 can be implemented as a central unit or a remote unit, such as central unit 102 and remote unit 104 described above. The communication unit 200 includes a plurality of application ports 208. Each of the application ports 208 in this example are implemented using an elastic service, as defined above. In particular, in the example shown in FIG. 2, each of the application ports 208 is configured to transport Ethernet frames.

The communication unit 200 also includes a plurality of DSL ports 212-1 ... 212-M each configured to transport DSL frames to another communication unit. Each of the DSL ports 212-1 ... 212-M is coupled to a respective DSL chipset or transceiver 214-1 ... 214-M. In particular, in this example, the DSL transceivers 214-1 ... 214-M are configured according to the Global.standard High-Bit-Rate Digital Subscriber Line (G.SHDSL) standard defined in the ITU-T Standard G.991.2. Each of the DSL transceivers 214-1 ... 214-M receives timeslots corresponding to a timeslot map from a processing circuit 216. The timeslot map is created by a central processing unit (CPU) 218 in response to user input. In the example shown in FIG. 2, the processing circuit 216 is implemented as a field programmable gate array (FPGA) 216. Notably, although the processing circuit 216 is implemented as a field programmable gate array (FPGA) in this example, other processing circuits can be used in other embodiments. For example, in other embodiments, an application specific integrated circuit (ASIC) can be used. Each PCM stream from the FPGA 216 to the DSL transceivers 214-1 ... 214-M contains the timeslots of the entire timeslot map. Each transceiver 214 is configured at certain events, such as initialization and/or protection events, with information from the timeslot map corresponding to the respective transceiver 214. For example, the CPU 218 configures the FPGA 216 to place the timeslots from the application ports 208 into a specific order in the PCM stream. The CPU 218 also configures each transceiver 214 to know which timeslots to extract from the PCM stream based on the specific order and to transport the extracted timeslots in a DSL frame over the respective DSL port 212. In the reverse direction, the FPGA 218 uses the timeslot map information from the CPU 218 to switch timeslots received from the transceivers 214 to the corresponding application port 208.

The timeslot map indicates which timeslots are to be processed by the respective DSL transceiver 214-1 ... 214-M. For example, the timeslot map may indicate that DSL transceiver 214-1 is to insert timeslots 1, 5, and 10 from a PCM stream received from the FPGA 216 into a DSL frame for transmission over the DSL port 212-1. The FPGA 216 is the functional block responsible for handling timeslot allocation. For example, the FPGA 216 creates the timeslot maps used by the transceivers 214-1 ... 214-M to interleave the timeslots as described above. The FPGA 216 and the DSL transceivers 214-1 ... 214-M are controlled by a central processing unit 218, which is responsible for configuration, status and error handling of the communication unit 200.

The communication unit 200 also includes one or more HDLC encoder/decoders 220. In the example shown in FIG. 2, there are two HDLC encoder/decoders 220-1 and 220-2. However, it is to be understood that in other embodiments, any other appropriate number of HDLC encoder/decoders can be used. The HDLC encoders/decoders 220 are provided between the Ethernet ports 208 and the FPGA 216 to HDLC encode/decode an Ethernet signal. In particular, when an Ethernet frame is input at one of the Ethernet ports 208, the frame is passed to the respective HDLC encoder/decoder 220 where the sync byte and start of frame byte of the Ethernet frame are removed to form a stripped Ethernet frame. The HDLC encoder/decoders 220 also append a two byte cyclic redundancy check (CRC) to the stripped Ethernet frame. HDLC flags with the pattern "01111110" are also inserted at the beginning and end of the frame. The HDLC flags are used to identify the start and end of a frame.

The Ethernet frame plus CRC is then examined for a continuous bit sequence of five 1's (that is, 11111). A zero is inserted at the end of each sequence of five 1's (that is, 11111). Zero insertion after a sequence of five 1s in the payload is used to avoid confusion of payload with HDLC flags at the beginning and end of the frame. The HDLC encoded Ethernet frame is then inserted into a time division multiplex (TDM) stream, such as a PCM stream. In the reverse direction, the HDLC flags are removed from the start and end of the frame. Similarly, the inserted "0" in the sequence "111110" is removed as well as the appended two byte CRC. The remaining Ethernet frame is then formatted with start of frame and sync bytes and passed to the corresponding application port 208 configured for Ethernet signals.

Figure 3:
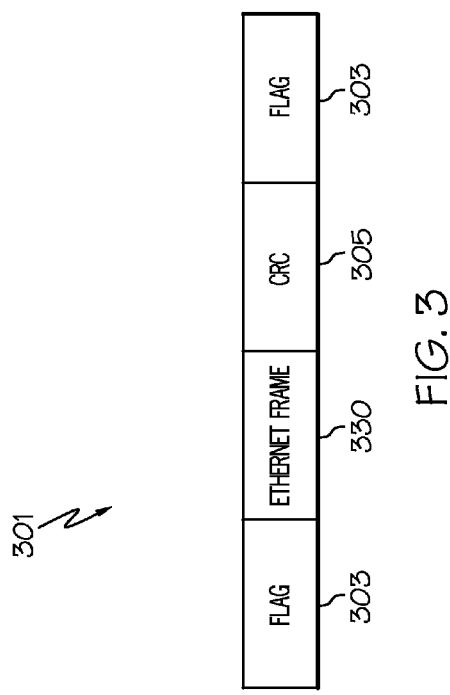
FIG. 3 depicts one embodiment of the data structure of high-level data link control encoding.

FIG. 3 shows one embodiment of the data structure 301 of the HDLC encoding. The data structure 301 includes two flag 303, each of which is one binary byte 01111110. The CRC 305, in this example, is 16 bits long and is created using the polynomial X16+X12+X5+1. The Ethernet frame 301 and the cyclic redundancy check 305 are bitwise checked. If a contiguous sequence of five ones (11111) are found, a zero is inserted so that no pattern between the start of the Ethernet frame 330 and the end of cyclic redundancy check 305 can resemble a flag (01111110). This prevents erroneous detection of flags within the Ethernet frame 301 or cyclic redundancy check. The HDLC flags are used to identify the start and end of a frame. The HDLC encoder/decoders 220 then insert the encoded frame into a time division multiplex (TDM) byte stream and pass the TDM stream to FPGA 216.

Likewise, when a frame is prepared for egress from the DSL unit 200 via one of the Ethernet ports 208, FPGA 216 extracts the corresponding timeslots from the PCM stream received from the respective chipset 214 and passes the timeslots to the corresponding HDLC encoder/decoder 220 in a TDM byte stream. The TDM byte stream is examined in the HDLC encoder/decoder 220 for HDLC frames by searching for HDLC flags. When a frame is detected, the HDLC encoder/decoder 220 removes the HDLC flags from the start and end of the frame. Similarly, the inserted "0" in the sequence "111110" is removed as well as the appended two byte CRC in HDLC encoder/decoder 220 as discussed above. Before removal, the CRC is used for error detection. The HDLC encoder/decoder 220 then prepends the start of frame and sync bytes to the frame and passes the Ethernet frame to the corresponding Ethernet port 208 where the frame is transmitted.

Figure 4:
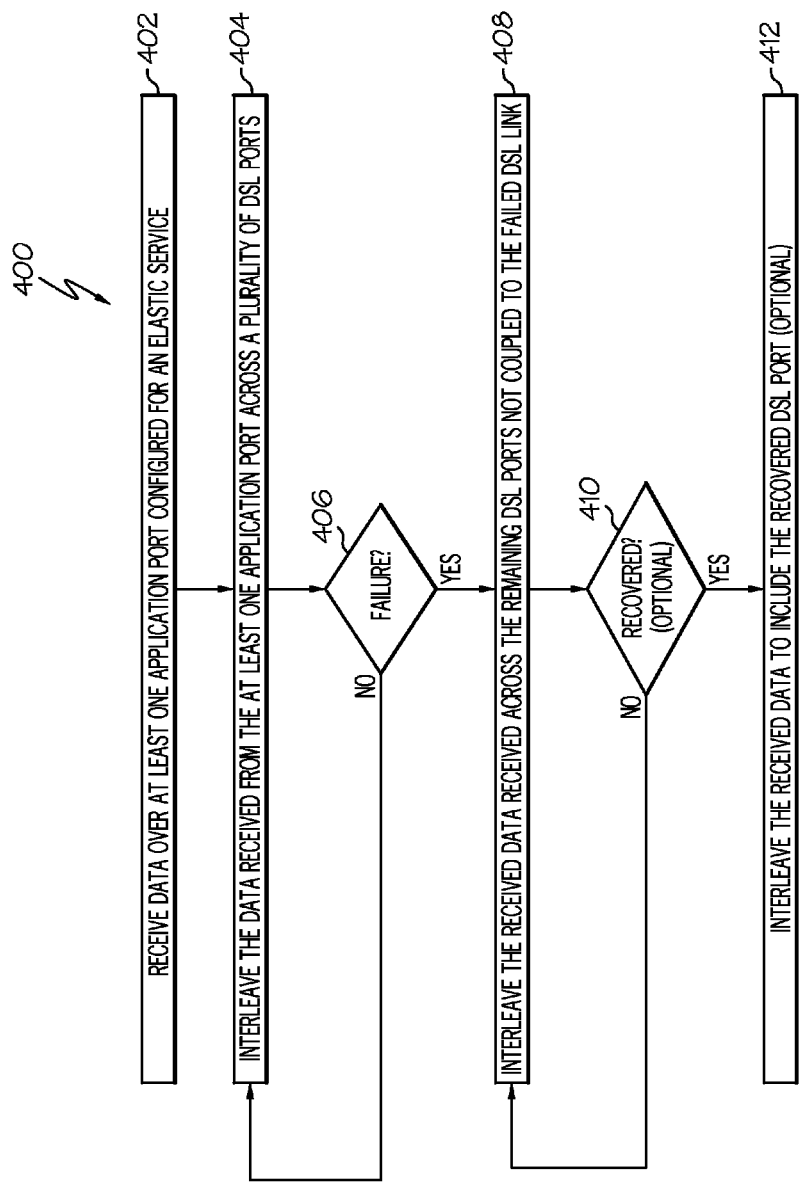
FIG. 4 is a flow chart depicting one embodiment of a method of communication in a network.

FIG. 4 is a flow chart depicting an exemplary method 400 of communication in a network. The method 400 can be used in a network such as network 100 described above. At block 402, data is received over at least one application port configured for an elastic service. For example, in some embodiments, the elastic service is an Ethernet service, as described above. At block 404, the data received from the at least one application port is interleaved across a plurality of DSL ports. Each DSL port is allocated a set of DSL timeslots for transport of the data received over the at least one application port. For example, in some embodiments, each DSL port is allocated the same number of DSL timeslots as the other DSL ports. In other embodiments, the number of allocated DSL timeslots varies for each DSL port.

In some embodiments, the data is interleaved circularly and serially across the plurality of DSL ports. Circularly interleaving the data refers to assigning a first PCM timeslot to a first one of the plurality of DSL ports, the next PCM timeslot to the next DSL port, the third PCM timeslot to the next DSL port, and so forth until a PCM timeslot has been assigned to each of the DSL ports. After a timeslot has been assigned to each of the DSL ports, the next PCM timeslot is assigned to the first DSL port, etc. Serially refers to assigning all the data from the at least one application ports, one application port at a time. In other words, in embodiments with more than one application port, all the data from the first application port is assigned circularly across the plurality of DSL ports. Once all the data from the first application port has been assigned, the data from the next application port is assigned circularly across the plurality of DSL ports, etc.

It is to be understood that in other embodiments, the data from the at least one application port is interleaved in a different manner. For example, in some embodiments, the data is interleaved circularly and in parallel. That is, the timeslots are not interleaved one application port at a time. For example, in an embodiment having two application ports, a first time slot from a first application port is assigned to the first DSL port. Then, a first timeslot from the second application port is assigned to the second DSL port. A second timeslot from the first application port is then assigned to the third DSL port and so forth until all the timeslots from each of the application ports is assigned to one of the DSL ports.

At block 406, it is determined if a failure has been detected on one of the DSL links coupled to the DSL ports. When a failure is detected at block 406, the data received from the at least one application port is interleaved across the remaining DSL ports not coupled to the failed DSL link without adjusting the set of DSL timeslots allocated to each of the respective DSL ports, at block 408. For example, if each DSL port is allocated 25 DSL timeslots, the number of timeslots allocated to each DSL port is not increased when one of the DSL links fails. For example, if there are 100 total DSL timeslots allocated to each of 4 DSL ports, 25 DSL timeslots to each DSL port, when one of the DSL ports fails, there are 75 total DSL timeslots remaining.

At block 410, it is optionally determined if the failed DSL port has recovered. If the failed DSL port has recovered, the data is interleaved again to include the recovered DSL port, in some embodiments, at block 412. For example, the timeslot map can be updated as discussed above to include the recovered DSL link. In other embodiments, the recovered DSL link is not included even when the DSL link recovers.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A communication unit comprising:
   at least one application port configured for an elastic service;
   a plurality of digital subscriber line (DSL) transceivers each coupled to a respective DSL link; and
   a processing circuit coupled to the at least one application port and the plurality of DSL transceivers, the processing circuit configured to provide a copy of data received from the at least one application port to each of the plurality of DSL transceivers via a respective data stream comprising timeslots, the processing circuit further configured to provide a timeslot map to each of the DSL transceivers, the timeslot map indicating which of the timeslots in the data stream are to be processed by each respective DSL transceiver such that the data from the at least one application port is interleaved across the plurality of DSL transceivers;
   wherein when a failure is detected on one of the DSL links, the processing circuit is configured to update the timeslot map such that the data from the at least one application port is interleaved across the remaining DSL transceivers not connected to the failed DSL link without changing the respective number of timeslots allocated to each remaining DSL transceiver.

2. The communication unit of claim 1, wherein the processing circuit is a field programmable gate array (FPGA).

3. The communication unit of claim 1, wherein the elastic service is an Ethernet service; and
   wherein the communication unit further comprises one or more high-level data link (HDLC) encoders configured to HDLC encode an Ethernet signal received over the at least one application port.

4. The communication unit of claim 3, wherein the at least one application port is configured to use an Ethernet flow control protocol to delay data received at the at least one application port while the timeslot map is updated.

5. The communication unit of claim 1, wherein the processing circuit is configured to update the timeslot map to include the DSL transceiver coupled to the failed DSL link when the failed DSL link recovers.

6. The communication unit of claim 1, wherein each of the DSL transceivers is configured according to the G.SHDSL standard.

7. The communication unit of claim 1, wherein the at least one application port comprises a plurality of application ports, each of the plurality of application ports configured for an elastic service.

8. The communication unit of claim 1, wherein the processing circuit is configured to provide a timeslot map such that the data from the at least one application port is interleaved across the plurality of DSL transceivers circularly and serially.

* * * * *